United States Patent [19]
Ishikawa et al.

[11] 3,729,237
[45] Apr. 24, 1973

[54] SPLIT HYDRAULIC BRAKING SYSTEM
[75] Inventors: Masakazu Ishikawa; Hiroyuki Oka, both of Aichi-ken, Japan
[73] Assignee: Toyota Jidosha Kogyo Kabushiki Kaisha, Toyota-shi, Aichi-ken, Japan
[22] Filed: Oct. 1, 1970
[21] Appl. No.: 77,150

[30] Foreign Application Priority Data
Oct. 12, 1969 Japan...............................44/78122

[52] U.S. Cl. ...............................303/84 A, 303/6 C
[51] Int. Cl. ................................................B60t 15/46
[58] Field of Search ............................303/6 C, 84 A

[56] References Cited

UNITED STATES PATENTS 3,448,230   6/1969   Bueler...............................303/6 C X
3,441,318   4/1969   Bueler...................................303/6 C
3,450,443   6/1969   Bueler...................................303/6 C Primary Examiner—Edward A. Sroka
Attorney—McGlew and Toren

[57] ABSTRACT

A hydraulic brake system is formed of two separate hydraulic circuits, one for the front wheels and the other for the rear wheels of an automotive vehicle. Both circuits are connected hydraulically to a master cylinder and one of the hydraulic circuits contains a control valve assembly for varying the pressure of the hydraulic brake fluid in that circuit. Means are provided in operative engagement with the control valve assembly for maintaining the valve assembly in the inoperative condition when a failure occurs in the other circuit. As a result of the failure, the circuit containing the valve assembly operates at the pressure supplied from the master cylinder.

20 Claims, 15 Drawing Figures

Patented April 24, 1973  3,729,237

INVENTORS
MASAKAZU ISHIKAWA
HIROYUKI OKA
BY McGlew and Toren
ATTORNEYS

Patented April 24, 1973 3,729,237

INVENTORS
MASAKAZU ISHIKAWA
HIROYUKI OKA
BY McGlew and Toren
ATTORNEYS

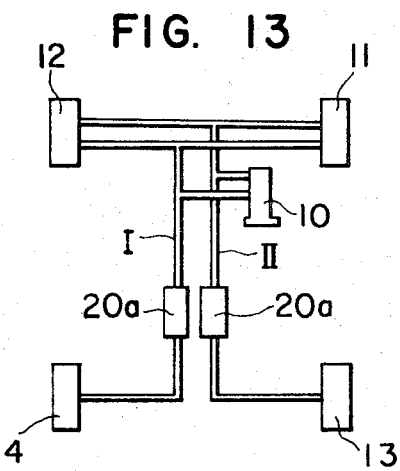
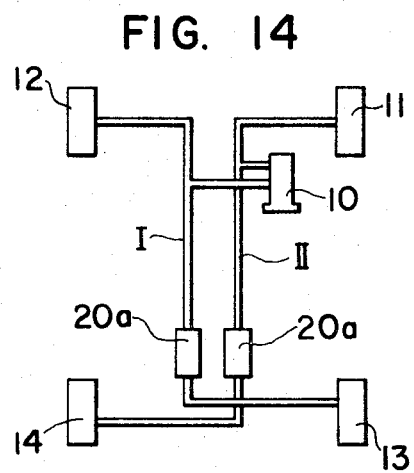
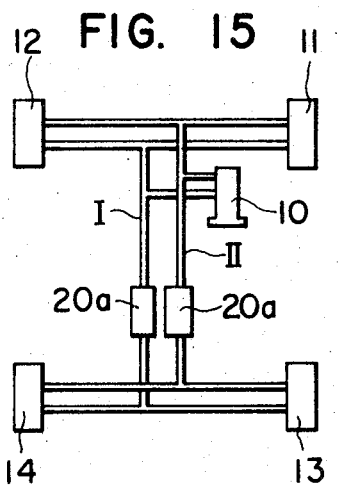

SPLIT HYDRAULIC BRAKING SYSTEM

SUMMARY OF THE INVENTION

The present invention is directed to a split hydraulic brake system commonly used in the service brake systems of automotive vehicles and, more particularly, it concerns the arrangement of a control valve assembly positioned in one hydraulic circuit with means for placing the valve assembly in the inoperative condition.

Split braking systems for service brakes generally refer to a system in which the hydraulic brake fluid is supplied independently to separate hydraulic circuits each servicing either the front or rear wheels of the vehicle. As a general rule, in conventional split hydraulic brake systems, the front wheel cylinders are pressurized directly from the master cylinder at the braking force determined in direct response to the force exerted on the brake pedal. However, the pressure communicated from the master cylinder to the circuit containing the rear wheels is processed through a control valve assembly which adjusts the fluid pressure to a lower level. In such a brake system, if a failure occurs in the circuit servicing the front wheels, it is necessary to apply a greater force on the brake pedal for the purpose of developing a sufficient braking force in the rear wheel cylinders.

Therefore, it is the primary object of the present invention, to provide a control arrangement for a split hydraulic brake system in which a control valve assembly is located in one of the hydraulic circuits so that when a failure occurs in the other hydraulic circuit, the control valve assembly is rendered inoperative and the full braking pressure from the master cylinder is developed in the wheel cylinders in the circuit containing the valve assembly.

Accordingly, in the present invention, a split hydraulic brake system for an automotive vehicle is divided into two separate hydraulic circuits, one containing the brake cylinders for the front wheels and the other containing the brake cylinders for the rear wheels. A master cylinder supplies hydraulic braking fluid to each of the circuits in direct relationship to the force exerted on a brake pedal. A control valve assembly is positioned in one of the hydraulic circuits for varying the brake fluid pressure delivered to the brake cylinders in that circuit. In the event a failure occurs in the circuit which does not contain the control valve assembly, an arrangement is provided to monitor the failure and place the control valve assembly in its inoperative condition so that the full pressure developed within the master cylinder is supplied to the brake cylinders in the circuit containing the valve assembly. The pressure of the hydraulic brake fluid can be monitored by mechanical or electrical means.

In accordance with the characteristic functioning of the control valve assembly described above, the valve action in the assembly can be provided by any of the following: hydraulic pressure-proportioning valve means, limiting valve means, or load-sending valve means. Normally, the control valve assembly is associated with the rear wheel brake cylinders for providing a lower braking pressure in the rear cylinders than in the front cylinders and thereby avoiding rear wheel lock. Where a hydraulic pressure-proportioning valve is used, a valve piston is resiliently biased into contact with a cylindrical plug. On the end of the valve piston, adjacent the cylindrical plug, a chamber is formed for housing a poppet valve, and the chamber is maintained in hydraulic communication with the master cylinder. Due to the resilient biasing of the valve cylinder against the cylindrical plug, the poppet valve is abutted against the cylindrical plug and the valve is maintained in its opened condition. When the braking force developed in the master cylinder is below a selected level, the pressurized braking fluid flows through the proportioning valve without any change occurring in the pressure supplied to the rear brake cylinders. However, when the braking pressure exceeds the selected level, the braking pressure supplied to the rear brake cylinders is reduced at a certain rate as compared to the pressure supplied from the master cylinder into the control valve assembly. Further, in another embodiment of the present invention, the control valve assembly contains a valve piston resiliently biased by a spring member, and a control valve positioned in a chamber located at one end of the valve piston. A monitoring device is provided for effecting a continuous check on the hydraulic pressure in the circuit which does not contain the valve assembly. The control valve is actuated by solenoid-operated means.

In another preferred embodiment of the invention, the monitoring device can be arranged to position the control valve assembly in its opened condition while keeping the valve piston in its initial position. Alternatively, the monitoring device can be arranged to actuate the control valve assembly directly to place it in the opened condition.

In still another embodiment, by-pass valves are provided in parallel with the control valve assembly for hydraulically or electromagnetically opening the control valve assembly when a pressure failure occurs in the other hydraulic circuit. When the by-pass valves are opened, the control valve assembly no longer is effective within the hydraulic circuit.

The various features of novelty which characterize the invention are pointed out with particularity in the claims annexed to and forming a part of this specification. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the drawing:

FIGS. 13 to 15 show schematic arrangements providing modification of the arrangements shown in FIGS. 10 and 12.

DESCRIPTION OF GENERAL BACKGROUND OF INVENTION

Figure 1:
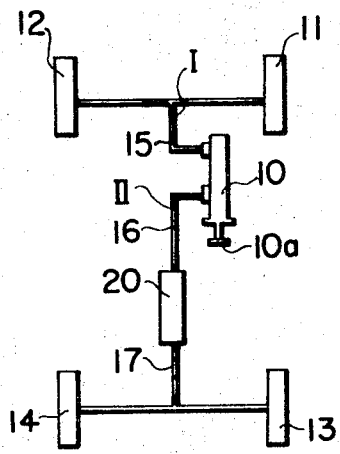
FIG. 1 is a schematic showing of the general arrangements of a split hydraulic brake system.

In FIG. 1, a typical split hydraulic braking system is shown which includes a master cylinder 10 arranged to supply pressurized hydraulic braking fluid into lines 15 and 16 at a braking force proportional to the pressure exerted on a brake pedal 10a operatively associated with the master cylinder. A pair of front wheel cylinders 11 and 12 are connected to the master cylinder by the line 15, this part of the overall system being designated as hydraulic circuit I. Rear wheel cylinders 13 and 14 are connected to the master cylinder 10 by means of the line 16, a control valve assembly 20 and another line 17, this portion of the overall system being designated as hydraulic circuit II. The control valve assembly 20 regulates the pressure supplied to the rear wheel cylinders 13 and 14 from the master cylinder.

Figure 2:
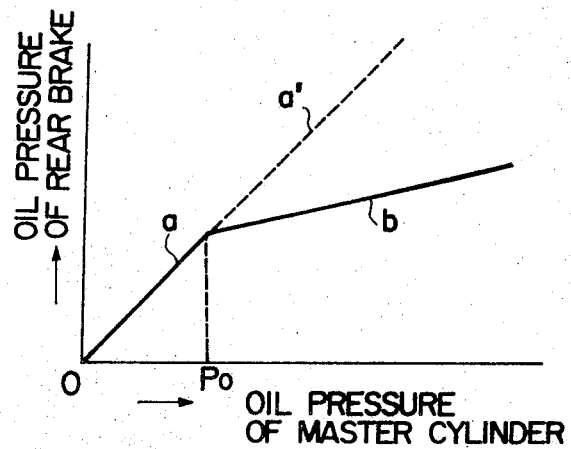
FIG. 2 is a graphical representation of the operational characteristics of a control valve assembly incorporated in one of the hydraulic circuits of the brake system as shown in FIG. 1.

In FIG. 2 the braking pressure exerted on one of the rear wheels is plotted against the master cylinder pressure in an arrangement where the control valve assembly 20 is a hydraulic pressure-proportioning valve which regulates the pressure in hydraulic circuit II connected to the rear wheel cylinders. In FIG. 2, it can be appreciated that, when the hydraulic pressure developed in master cylinder 10 is below a certain level Po, the control valve assembly is maintained in a nonoperative condition. Accordingly, as the pressure in the master cylinder increases up to a certain point or level, the braking pressure in the rear wheel cylinders will increase linearly as displayed by the line a. When the pressure in the master cylinder exceeds the level Po, the control valve assembly becomes operative and the braking pressure supplied to the rear wheel cylinders increases at a reduced rate relative to the pressure in the master cylinder and this rate is indicated by the line b. Assuming that a failure occurs in the hydraulic circuit I, for example due to oil leakage in the circuit, the pressure supplied to the front wheel cylinders will drop considerably below that developed in the master cylinder. Under these conditions, even if the hydraulic circuit II is operating normally, the pressure in the rear wheel cylinders 13 and 14 is also reduced below the level in the master cylinder when the force exerted on the brake pedal 10a develops a pressure in the master cylinder above the pressure level Po as shown in FIG. 2. In such a situation, the braking effort exerted on the rear wheels is correspondingly reduced and the total braking effort applied to the front wheels and the rear wheels is below that required for normal operation of the two hydraulic circuits I and II.

When a failure takes place in hydraulic circuit II while hydraulic circuit I continues to operate normally, the front wheel cylinders receive the hydraulic braking fluid at a pressure corresponding to the force exerted on the brake pedal, as shown by the dotted line a' which forms a rectilinear continuation of the line a in FIG. 2. In this situation the overall braking pressure in the system is higher than when a failure occurs in hydraulic circuit I. Accordingly, in view of the foregoing, the present invention proposes a hydraulic brake system arrangement in which the control valve assembly is rendered non-operative when a failure occurs in the other circuit which is directly connected to the pressure in the master cylinder.

DETAILED DESCRIPTION OF THE INVENTION

In the various figures the same reference numerals are employed for similar parts of the split hydraulic brake system.

Figure 3:
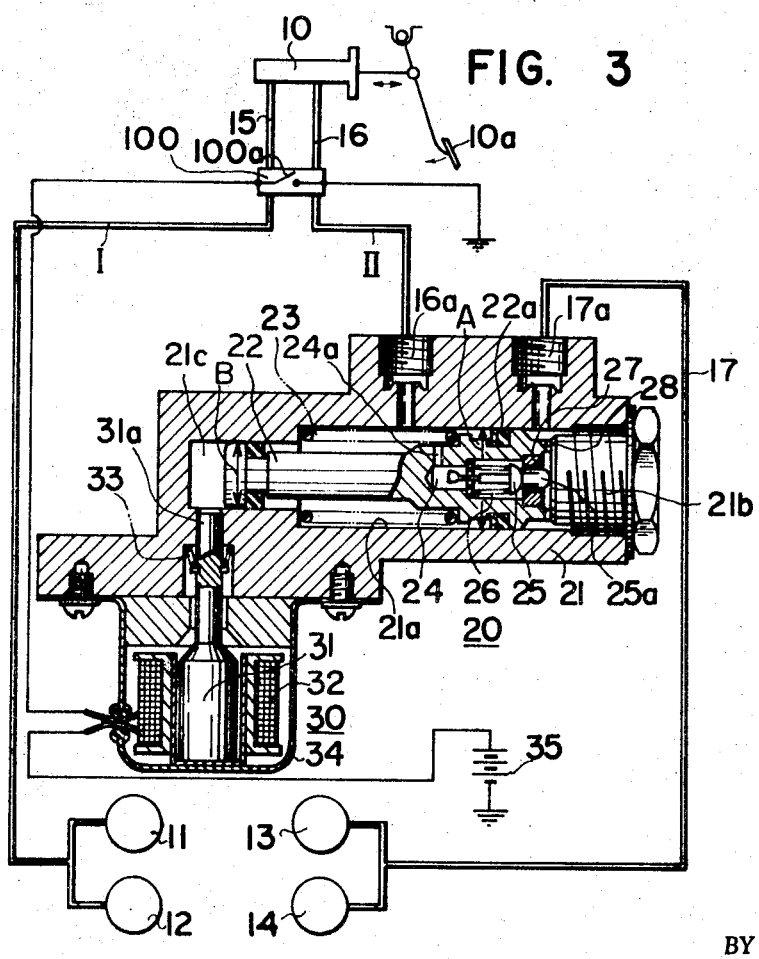
FIG. 3 is a partly schematic illustration of a split hydraulic brake system, in accordance with the present invention, with a detailed cross sectional showing of a combined control valve assembly and a solenoid-operated member.

In FIG. 3, a general arrangement of a split hydraulic brake system is shown in which a hydraulic brake pressure-proportioning valve 20 and a electromagnetically operated check device 30 are shown in section on an enlarged scale.

In FIG. 3 the brake pedal 10a is operatively connected to the master cylinder 10 for supplying pressurized hydraulic braking fluid into the lines 15 and 16. The line 15 is directly connected to the front wheel cylinders 11 and 12 while line 16 is connected to the rear wheel cylinders 13 and 14 through a control valve assembly 20. The control valve assembly 20 is formed of a cylinder casing 21 having an inlet port 16a and an outlet port 17a. The line 16 is connected to the inlet port 16a of the control valve assembly. Within the cylinder casing 21a a cylindrical shape chamber 21a is provided and contains a slidably displaceable valve piston 22. As shown in FIG. 3, a prestressed spring 23 biases the valve piston 22 toward the right-hand side, that is toward a cylinder plug 21b which closes the right-hand end of the chamber 21a. Within the right-hand end of the valve piston 22, a chamber 24 is formed containing a poppet valve 25 and a back-up spring 26 positioned within the chamber 24 urges the poppet valve 25 toward the right as shown in FIG. 3. A valve seat 27 is located in the chamber 21a and cooperates with the poppet valve 25.

When the brake pedal 10a is depressed, hydraulic braking fluid under pressure is supplied from the master cylinder 10 into both of the lines 15 and 16, and from line 16 the braking fluid flows through inlet port 16 a into the chamber 21a of the control valve assembly 20 and then passes into the chamber 24 through a port 24a which extends transversely through the piston 22. In the position shown in FIG. 3, a projection 25a on the poppet valve 25 abuts against the cylinder plug 21b and the poppet valve is maintained in spaced relationship from the valve seat 27. Consequently, the pressurized braking fluid flowing into the chamber 24 passes unimpeded into a space around the projection 25a of the poppet valve and then into a radial passage 28 located on the right-hand end face of the piston 22 and flows through the outlet port 17a into line 17 which is connected to the rear wheel cylinders 13 and 14. The hydraulic braking pressure exerted on the transverse surface of the piston 22, which has a diameter B, serves to move the piston to the left, note FIG. 3. As long as the hydraulic brake fluid pressure is maintained below the resilient biasing force of the spring 23, the poppet valve 25 is kept in its open position. Accordingly, the hydraulic brake fluid is supplied to the rear wheel cylinders 13 and 14 through the control valve assembly 20 and line 17 without any change in pressure until the pressure in the master cylinder reaches the level Po in accordance with the arrangement shown in FIG. 2.

When the pressure developed within the master cylinder 10 reaches the level Po, the force exerted in the leftward direction by the braking fluid on the piston 22 causes the piston to move to the left until the poppet valve 25 is placed in engagement with the valve seat 27. As the braking fluid pressure within the master cylinder exceeds the level Po, the poppet valve 25 is closely seated against the valve seat 27 and a resultant pressure reduction occurs at the outlet port 17a as compared to the pressure at the inlet port 16a. As a result, the axial force exerted in the leftward direction within the chamber 21a on the transver area of the piston which has a diameter B is reduced below the biasing force applied to the piston by the spring 23 and the pressure acting on an annular zone defined by the difference between the transverse area of the piston having a diameter A and the other transverse area of the piston having a diameter B. As a result, the valve is subjected to forces which tend to place it in the open condition. However, a dynamic equilibrium exists between the valve piston 22 and the poppet valve 25 where by increasing the pressure at the inlet port 16a the pressure at the outlet port 17a is reduced at a fixed rate with respect to the pressure at the inlet port. In this way the braking pressure applied to the rear wheel cylinders occurs along the straight line b in FIG. 2, which has a smaller angle of slope than the straight line a.

A differential pressure switch 100 is positioned across the lines 15 and 16 for sensing any failure in the hydraulic circuit I, that is, the circuit which includes the front wheel cylinders. Within the switch 100, a movable contact element 100a is arranged which is activated when the pressure in line 15 drops to a certain level below that in line 16. As shown in FIG. 3, the electromagnetic check means 30 is connected to the switch 100 and is operatively associated with the control valve assembly 20. The check means 30 is composed of an armature 31 positioned within a solenoid 32 which has one end connected to the positive terminal of a battery 35 and its other end is connected to a stationary contact on the differential pressure switch 100. In addition, a return spring 33 acts on the armature 31 and a cover 34 is provided over the parts of the check means 30. The negative terminal of the battery 35 is grounded, and when the differential pressure switch 100 is closed the solenoid 32 is energized. When the solenoid 32 is energized, the armature is urged upwardly against the bias of spring 33 and the upper end of the armature, as viewed in FIG. 3, is inserted into the chamber 21c at the left-hand end of the chamber 21 and thereby prevents movement of the valve piston 22. The left-hand end face of the piston 22 and the upper end face of the armature 31 are both chamfered, as shown in FIG. 3, so that the armature positively engages the chamfered edge of the piston end face with its chamfered edge even when the piston is moved into its equilibrium position. Accordingly, the piston 22 can be positively held in the position shown in FIG. 3 with the poppet valve 25 separated from its valve seat 27. Therefore, it can be appreciated, when a pressure failure occurs in hydraulic circuit I, the differential pressure switch 100 is actuated and through the electromagnetic check means 30 holds the control valve assembly 20 in its open or non-operative position end, as a result, the hydraulic brake fluid is maintained at the pressure within the master cylinder and does not experience any reduction in pressure which takes place under ordinary operating conditions when the pressure in the master cylinder rises above a particular level.

Figure 4:
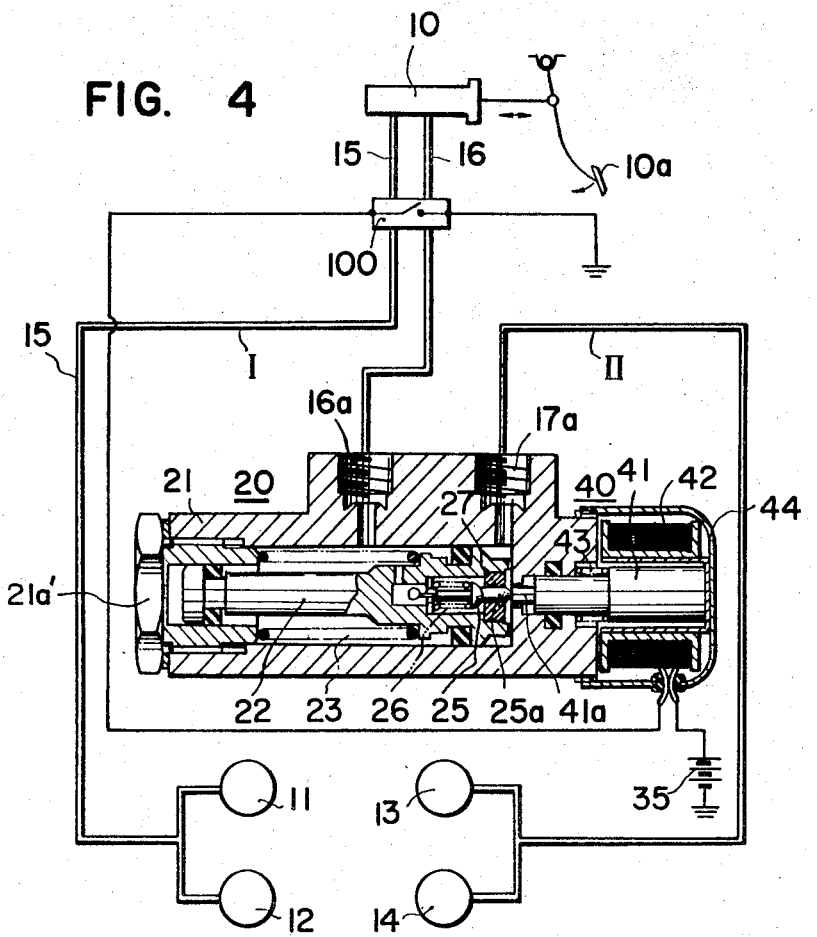
FIG. 4 is a view similar to FIG. 3, illustrating another embodiment of the arrangement of the control valve assembly and solenoid-operated member shown therein.

In FIG. 4 another embodiment of the split hydraulic braking system is shown where a solenoid-operated check device 40 is positioned in line with the poppet valve 25 and the piston 22, as compared to the arrangement in FIG. 3 where the axis of the check means 30 is disposed approximately normally to the axis of the piston and the poppet valve. The check device 40 is formed of an armature 41, a solenoid 42, a return spring 43 acting on the armature, and a cover 44 which is placed over the various parts of the check device. The control valve assembly 20 (hydraulic pressure-proportioning valve) has substantially the same construction as that shown in FIG. 3, with the exception of the cylinder plug 21a' being located in the left-hand end of the casing 21. At its left-hand end 41a, the armature 41 extends into contact with the oppositely directed end face 25a of the poppet valve 25. The working stroke of the armature is longer than the working stroke of the piston 22. Accordingly, when the armature is activated and its end 41a is displaced in the leftward direction it abuts against the end face 25a of the poppet valve and keeps the valve in the open position. As long as the armature is activated it maintains the control valve assembly in the non-operative position regardless of any occasional operative positions assumed by the valve piston 22. Accordingly, in the embodiment shown in FIG. 4, the armature 41 acts directly against the poppet valve 25, instead of against the opposite end of the valve piston 22 as shown in FIG. 3. However, its purpose is the same for maintaining the poppet valve 25 in the open position.

Figure 5:
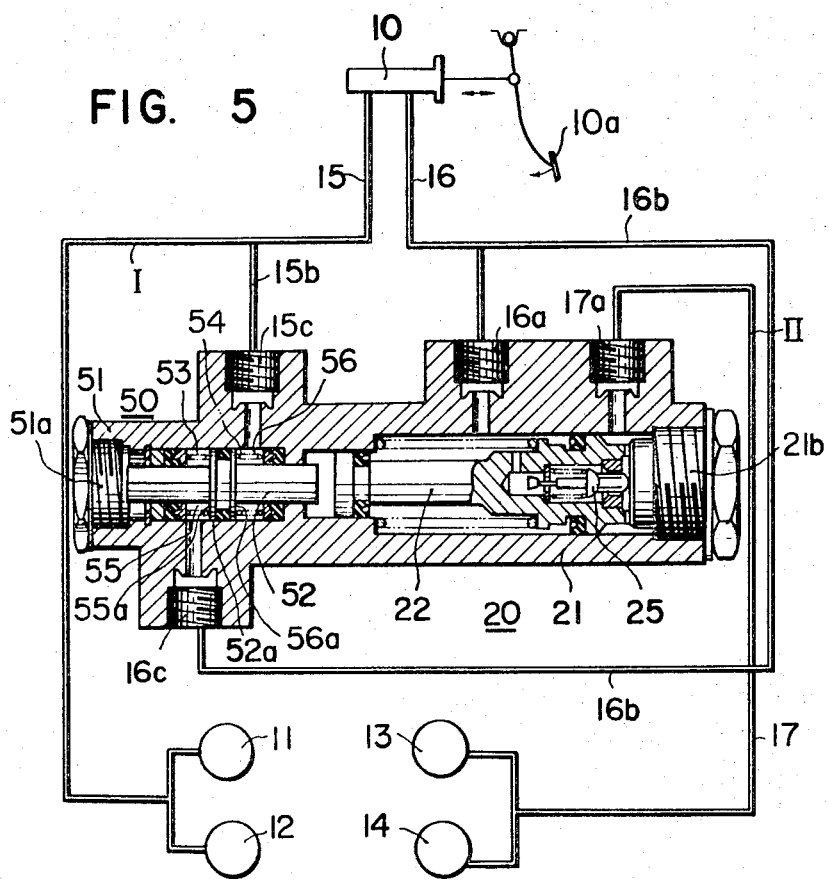
FIG. 5 is a view generally similar to FIG. 3 in which the control valve assembly is a valve responsive to the pressure differences in two hydraulic circuits.

In FIG. 5 a further embodiment of the present invention is shown, where, instead of the electromagnetic check means 30 and 40, a balance piston assembly 50 is used. The balance piston assembly consists of a cylinder 51 extending from the cylinder 21 of the control valve assembly 20 and a piston 52 is slidably displaceable within the chambers 55 and 56 formed within the cylinder. Within each of the chambers 55 and 56 a respective balance spring 53, 54 is arranged, respectively. The master cylinder 10 is connected to the cylinder 51 through lines 15, 15b and inlet port 15c and also through line 16, 16b and inlet port 16c. The piston 52 is in axial alignment with the piston 22 and the end of the cylinder 51 remote from the control valve assembly is closed by means of a plug 51a. Hydraulic braking fluid within tthe hydraulic circuits I and II, pressurized within the master cylinder 10, is supplied into the chambers 56 and 55 through the inlet ports 16c and 15c, respectively. Assuming that both circuits I and II are in normal operating condition, the pressure within the chambers 55 and 56 is the same as the master cylinder pressure. Accordingly, the pressures exerted on partitions 55a and 56a on piston 52 are in opposition to each other due to the pressure of the hydraulic braking fluid within the chambers 55 and 56 and a counterbalancing action takes place and keeps the piston 52 in the position shown in FIG. 5 where the piston does not contact the end of the valve piston 22. If, due to a failure in the pressure in hydraulic circuit I, there is a reduction in the pressure, supplied through lines 15, 15b and inlet port 15c into chamber 56, this results in an unbalancing of the pressures in the chambers 55 and 56, and the pressure in chamber 55, that is the pressure in hydraulic circuit II, acting on partition 55a tends to displace the piston 52 to the right, as viewed in FIG. 5. By providing the springs 53 and 54 with lower spring constants, the piston 52 can be made more sensitive to a pressure differential in the chambers 55, 56. When the pressure differential exists, the piston 52 moves to the right and contacts the left-hand end of the piston 22 and maintains it in the non-operative position.

Figure 6:
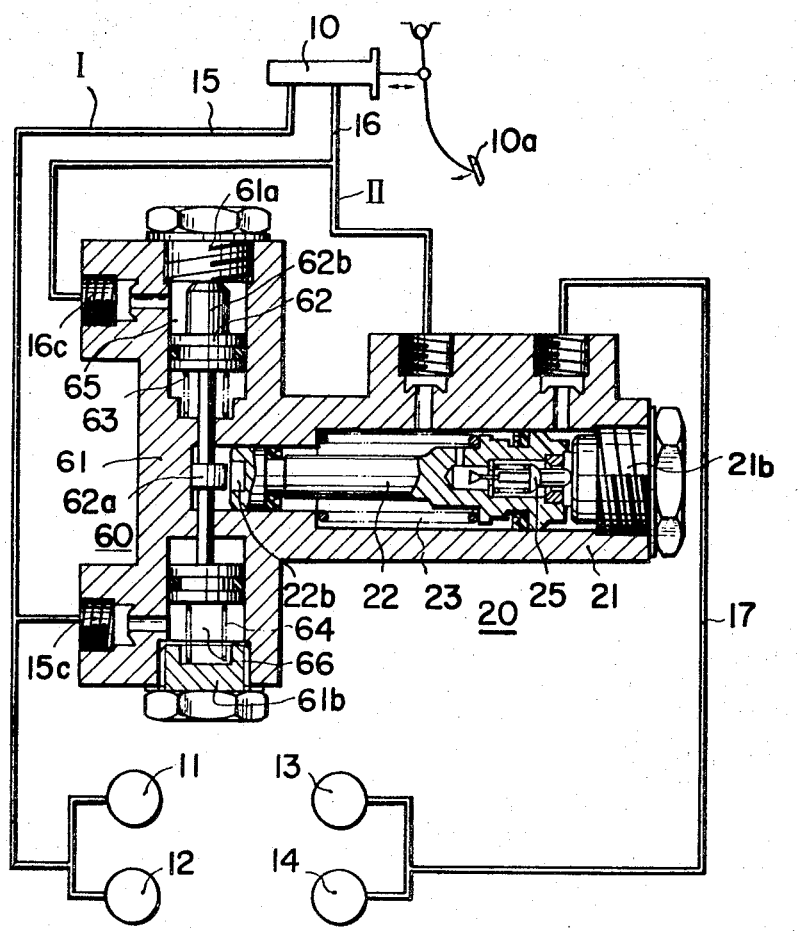
FIGS. 6 and 7 are views similar to FIG. 5 showing modified arrangements of the control valve assembly with a valve responsive to pressure differences in the hydraulic circuits as displayed in FIG. 5.

In FIG. 6 still another embodiment of the present invention is illustrated, which utilizes a check means 60 which acts, relative to the control valve assembly 20, in the same manner as the check means 30 disclosed in FIG. 3. The check means 60 is formed of a cylinder 61 extending transversely of and integral with the casing 21 of the control valve assembly 20. Within the cylinder 61 a piston 62 is positioned extending substantially normally to the piston 22 in the control valve assembly, and having spaced biasing springs 63 and 64 acting on the piston and with the opposite ends of the piston located within chambers 65 and 66. The opposite ends of the cylinder 61, that is its upper and lower ends as viewed in FIG. 6, are closed by plugs 61a and 61b. The line 15 connects the master cylinder 10 to an inlet port 15c which communicates with the chamber 66 of the check means 60. Similarly line 16 connects the master cylinder with an inlet port 16c which communicates with the chamber 65 within the cylinder 61. The pressurized hydraulic braking fluid supplied through hydraulic circuits I (line 15) and II (line 16) is supplied through the ports 16c and 15c into the chambers 65, 66 respectively. Due to the action of the biasing springs 63 and 64, the piston is urged into contact with plug 61a at the upper end of the cylinder 61. Mounted midway on the piston 52 is an engaging piece 62a which is located at the left-hand end of the chamber 21a and is positioned opposite a recess 22b in the left-hand end face of the valve piston 22.

In the position illustrated in FIG. 6, if the piston 22 is displaced to the left the recess 22b receives the engaging piece 62a on the piston and permits the axial displacement of the valve piston 22. However, if the pressure of the hydraulic brake fluid in hydraulic circuit I drops below the pressure in hydraulic circuit II, a pressure differential will develop between the chambers 65 and 66 with the result that the piston 62 will be urged downwardly displacing its engaging piece 62 a out of alignment with the recess 22b in the end of the valve piston 22. When the pressure within the two hydraulic circuits I and II is maintained at the same level the engaging piece 62a remains in alignment with the recess 22b. However, when a pressure differential is developed between the chambers 65 and 66 the engaging piece 62a is displaced out of alignment with the recess 22b and the engaging piece 62a prevents any leftward movement of the valve piston 22. Accordingly, when the engaging piece 62a is displaced from its normal center position the control valve assembly 20 is maintained in its non-operative condition.

Figure 7:
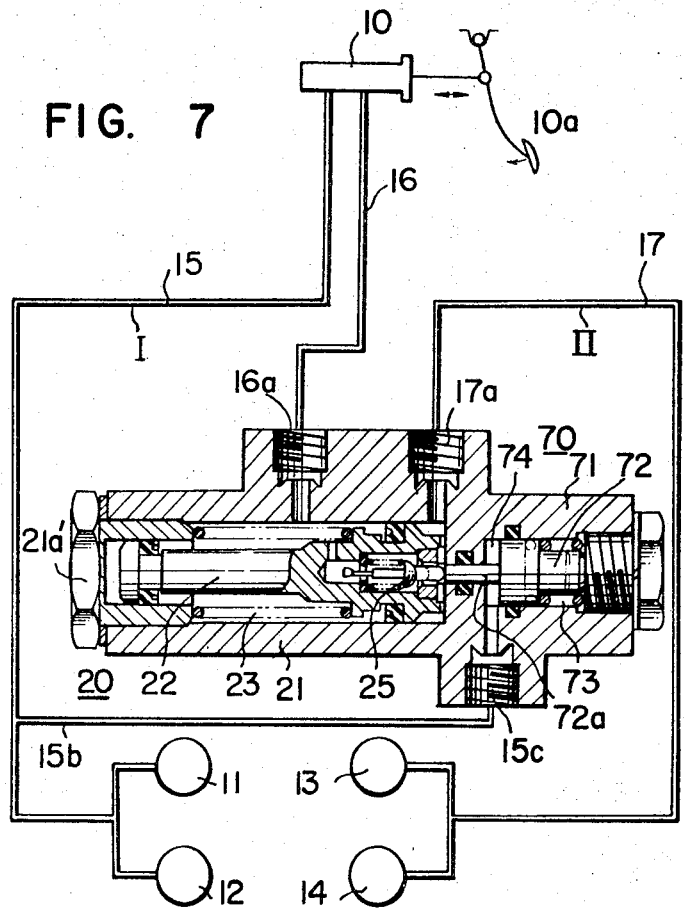
Figure 8:
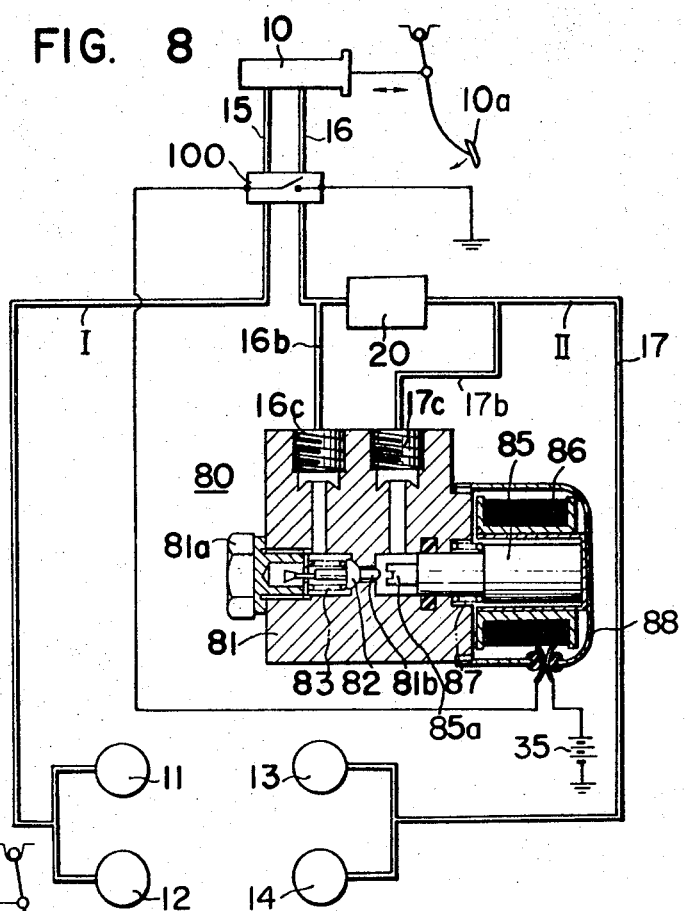
FIG. 8 is a view, generally similar to the arrangement shown in FIG. 4, with by-pass means located in the hydraulic circuits.

In FIG. 7, yet another embodiment of the present invention is disclosed in which a check means 70, similar in operation to the check device 40, shown in FIG. 4, is disposed in axial alignment with the piston in the control valve assembly. In the present embodiment, as compared to the solenoid-operated arrangement in FIG. 4, hydraulic braking fluid pressure is supplied into the check means 70 through a branch line 15b from the line 15 which connects the master cylinder 10 to the front wheel cylinders 11 and 12. The check means is formed of a cylinder 71 attached to the cylinder 21 of the control valve assembly and a piston 72 is positioned within the cylinder and is biased by a spring 73 in the leftward direction within a chamber 74. Normally, the piston 72 is retained at its position as shown in FIG. 7 by the pressure exerted by the braking fluid in the hydraulic circuit I. When the pressure within the hydraulic circuit I is lowered because of a failure, while ordinarily the pressure in hydraulic system I is the same as in the master cylinder 10, the piston 72 is urged toward the left due to the action of the spring 73. On the left-hand end of the piston 72a projection 72a extends in the leftward direction into the chamber 21 and abuts against the poppet valve 25 causing the valve to move to the left and keeping it in the open position, regardless of any occasional operative positions assumed by the piston 22. With the poppet valve in its open state, the control valve assembly is positioned in its non-operative condition. In the foregoing embodiments, the piston or the solenoid-operated armature of the check means acts on the valve piston or the poppet valve to keep the control valve assembly in its open position so that no reduction in pressure is imparted into the hydraulic circuit II for reducing the pressure in the rear wheel cylinders. As a result, when a failure takes place in the hydraulic circuit I the control valve assembly is rendered non-operative. However, as an alternative to the foregoing embodiments, a by-pass valve arrangement can be used for regulating the use of the control valve assembly. In FIG. 8, a by-pass valve 80 is made up of a cylinder 81 containing a poppet valve 82, a spring 83 in biasing contact with the poppet valve, an armature 85 in axial alignment with the poppet valve, a solenoid 86 for operating the armature 85, a spring 87 for returning the armature when the solenoid is deactivated, and a cover 88 for enclosing the various parts of the solenoid assembly. In hydraulic circuit II a branch line 16b connects the line 16 with an inlet port 16c to the by-pass valve. In addition, a control valve assembly 20 connects line 16 to line 17 which, in turn, extends to the rear wheel cylinders 13 and 14. Another branch line 17b connects the line 17 to an outlet port 17c from the by-pass valve 80. Located across the lines 15 and 16, each of which is in connection with the master cylinder 10, is a differential pressure-switch 100. The pressure-switch 100 is arranged to be closed when a pressure differential develops in the hydraulic circuits I and II. When a failure occurs in circuit I, the solenoid 86 is energized by a battery 35 and moves the armature 85 in the leftward direction toward the poppet valve 82.

Figure 9:
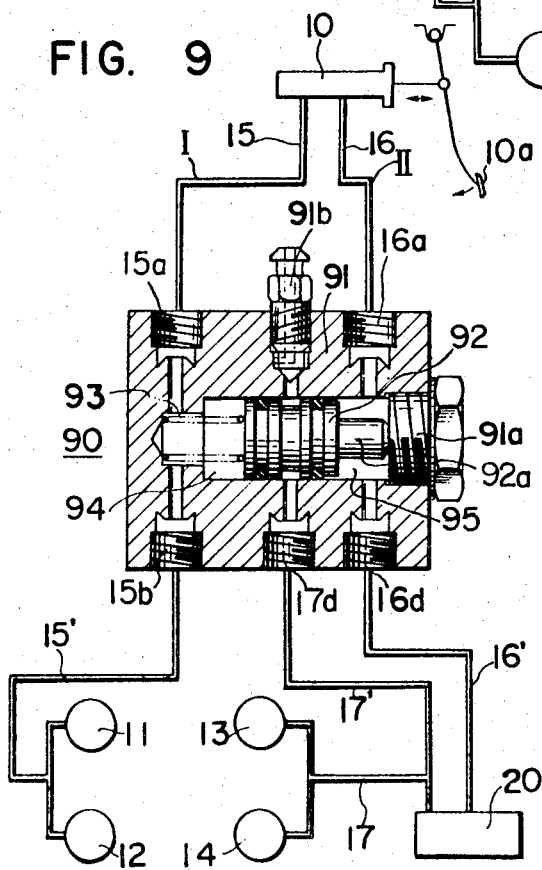
FIG. 9 is a view setting forth another embodiment of the general arrangement shown in FIG. 8.

When the armature 85 is displaced leftwardly by the solenoid 86, its left end 85a is placed in contact with the poppet valve 82 which, in turn, is displaced away from its valve seat 81b. The opening in the cylinder 81 containing the poppet valve is closed at its end by a plug 81a which adjusts the spring 83 to an optimum stress and closes off the valve chamber. In this arrangement the brake fluid in the master cylinder 10 is supplied through the by-pass valve 80 to the rear brake cylinders 13 and 14 for achieving the desired braking effect. In other words, when a failure occurs in hydraulic circuit I the solenoid-operated by-pass valve 80 permits direct flow of the brake fluid from line 16 into line 17 and then to the rear brake cylinders 13 and 14 for obtaining the required braking effect. In still another embodiment of the present invention, as shown in FIG. 9, a valve unit 90 is connected through the lines 15 and 16 with the master cylinder 10, for establishing the desired braking action in the rear wheel cylinders. The valve unit 90 consists of a cylinder 91 containing a piston 92 with a spring 93 bearing against one end of the piston. Within the cylinder 91 the piston is positioned at one end within a chamber 94 and at its other end within a chamber 95. Under the action of the spring 93, the end face 92a of the piston is abutted against the face of plug 91a which is positioned in the cylinder wall. A bleeder plug 91b is mounted within the wall of the cylinder within a passageway which communicates with the opening within the cylinder containing the piston 92. The line 15 extends from the master cylinder 10 to an inlet port 15a which in turn communicates with chamber 94, with an outlet port 15b which, in turn, is connected by a line 15' with the front wheel cylinders 11 and 12. At the other end of the cylinder 91, the chamber 95 communicates through an inlet port 16a with line 16 which is in communication at its other end with the master cylinder 10. From the chamber 95 the hydraulic braking fluid enters the outlet port 16d and passes into line 16' which conveys the fluid into the control valve assembly 20. In normal operation of the hydraulic circuits I and II, the pressurized hydraulic braking fluid from the circuit II flows through line 16, the valve unit 90 and the line 16' into the control valve assembly 20 where the fluid is pressure-regulated and then supplied into the rear wheel brake cylinders through line 17. When a failure occurs in hydraulic circuit I and the pressure within chamber 94 decreases, piston 92 is a failure in the leftward direction by the pressure of the fluid in chamber 95 and the fluid then passes through port 17d into line 17'. Accordingly, the brake fluid passes through line 17' and line 17 into the rear brake cylinders 13 and 14 for supplying sufficient braking effort when a failure occurs in the hydraulic circuit I.

Figure 10:
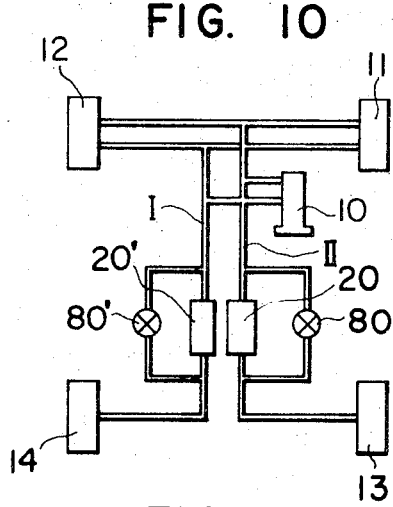
FIGS. 10 to 12 show schematic arrangements of several split hydraulic brake sysatems employing conventional by-pass valves.

In FIG. 10, still another embodiment is exhibited in which the split hydraulic brake system includes by-pass valves 80, 80' as shown in FIG. 8. Although the front wheel brake cylinders 11 and 12 are directly and independently supplied with brake fluid under pressure from the hydraulic circuits I and II, the rear wheel brake cylinders 13, 14 are connected to the control valve assemblies 20, 20', respectively. In a somewhat similar embodiment illustrated in FIG. 11, the hydraulic circuits I and II are connected to each other in a criss-cross or staggered relationship. The brake fluid from the master cylinder 10 is supplied, as before, to the wheel cylinders 12, 13 and 11, 14 through the hydraulic circuits I and II, respectively. By-pass valves 80 and 80' are associated with the control valve assemblies 20 and 20', respectively. In another similar arrangement shown in FIG. 12, the hydraulic circuits I and Ii are arranged symmetrically and in parallel with each other with respect to the brake cylinders. In this system, even with the failure of either one of the circuits, the hydraulic pressure is maintained in a positive manner in the brake cylinders by means of the remaining normally operating circuit.

Figure 11:
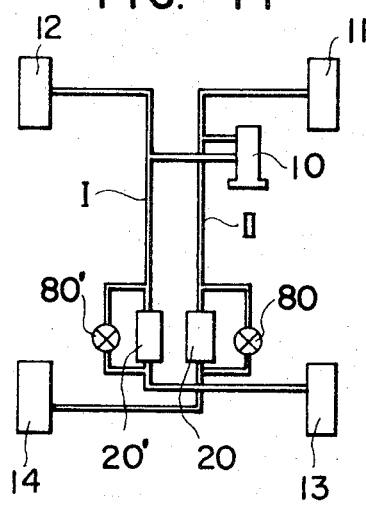
Figure 12:
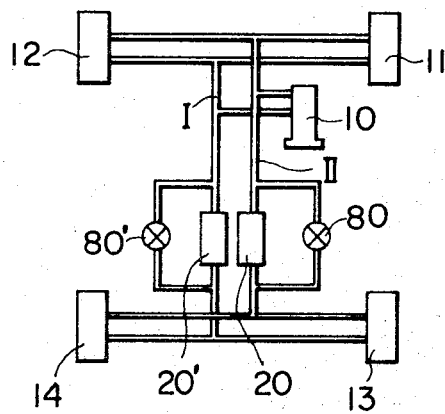

In the embodiments of FIGS. 10 to 12, the by-pass valves 80 and 80' are each located in one of the hydraulic brake circuits I, II, separately from the control valve assemblies 20 and 20'. However, the by-pass valves can be incorporated into the control valve assemblies 20 and 20a as shown schematically in FIGS. 13, 14 and 15. Although not shown in detail, the by-pass valves cooperate with the control valve assemblies to place tthe valve assemblies in the nonoperative condition.

The arrangement of the check means as shown in FIGS. 3, 5 and 6 in which the valve piston is held in its initial position and the control valve assembly is rendered non-operative, can be applied to any other hydraulic pressure control device. It can be appreciated from the foregoing disclosure that there is substantially no fear of a considerable reduction in the braking effort when a failure occurs in one of the hydraulic circuits, since the pressurized brake fluid from the master cylinder can be supplied to the brake cylinders in a circuit operating at the master cylinder pressure. Accordingly, with the arrangement of the present invention the braking distance can be decreased substantially while increasing traffic safety.

What is claimed is:

1. In a dual hydraulic brake system for automotive vehicles having front and rear wheels and including two separate hydraulic circuits connected to a master cylinder and each including the hydraulic brakes of a respective set of wheels, and a pressure regulating control valve in one circuit, having an inlet connection to the master cylinder and an outlet connected to the respective hydraulic brakes, and regulating the hydraulic brake pressure at its outlet in accordance with the hydraulic pressure in the master cylinder, the improvement comprising, in combination, a solenoid actuated component operatively connected to said control valve and operable, when actuated, to render said control valve ineffective to regulate the pressure at its outlet to maintain its outlet pressure substantially equal to the master cylinder pressure; a solenoid operable to actuate said component; an energizing circuit for said solenoid including a source of electric potential; and pressure differential responsive switch means in said energizing circuit and connected to both hydraulic circuits between said master cylinder and said control valve, said switch means, responsive to a pressure difference between said hydraulic circuits, controlling said solenoid to actuate said component.

2. In a dual hydraulic brake system, the improvement claimed in claim 1, in which said pressure regulating control valve comprises a body formed with a cylindrical bore communicating with said inlet and said outlet, and a piston displaceable in said bore and controlling communication between said inlet and said outlet; said component, when actuated, being movable into said bore to engage said piston and displace said piston to a position providing substantially unrestricted communication between said inlet and said outlet.

3. In a dual hydraulic brake system, the improvement claimed in claim 2, in which said piston is formed with a passage therethrough communicating with said inlet and outlet ports; and a poppet valve mounted in said piston and controlling flow of fluid through said passage; said component, when actuated, displacing said poppet valve to a position opening said passage.

4. In a dual hydraulic brake system, the improvement claimed in claim 3, wherein said poppet valve has an operating head projecting from an end of said piston and engageable with an end closure of said bore upon displacement of said piston to open said poppet valve; said component comprising a solenoid actuated plunger engageable with the opposite end of said piston to displace said piston in a direction to engage said poppet valve with said end closure of said bore to open said poppet valve.

5. In a dual hydraulic brake system, the improvement claimed in claim 4, in which said solenoid actuated plunger, when actuated, is displaceable in a direction substantially normal to and intersecting the path of movement of said piston.

6. In a dual hydraulic brake system, the improvement claimed in claim 3, in which said poppet valve has an operating head projecting from one end of said piston; said solenoid actuated component comprising a solenoid actuated plunger axially aligned with said poppet valve and having an inner end normally flush with an end wall of said bore; said poppet valve being engageable with said inner end of said solenoid plunger during displacement of said piston; said solenoid plunger, when actuated, projecting its inner end inwardly of said end wall of said bore to displace said poppet valve to a position opening said passage.

7. A split hydraulic brake system, as set forth in claim 1, wherein said element comprises a balance piston assembly, said balance piston assembly comprises a casing forming a chamber in axial alignment with the chamber in said control valve assembly, a piston disposed within said chamber in said balance piston assembly, said piston having a pair of axially spaced annular projections thereon, said annular projections on said piston cooperating with the chamber in said casing of said balance piston assembly for dividing said chamber into a first chamber containing one of said annular projections and a second chamber containing the other said annular projection, said first chamber being to one of said hydraulic circuits and said second chamber to the other said hydraulic circuit wherby hydraulic brake fluid is supplied from said master cylinder into said first and second chambers and when a pressure failure occurs in said hydraulic circuit not containing said control valve assembly a pressure differential develops between said first and second chambers and displaces said piston into said control valve assembly for holding said control valve assembly in the non-operative position.

8. A split hydraulic brake system, as set forth in claim 1, wherein said element comprises a balance piston assembly comprising a casing forming a pair of chambers with the axes thereof extending transversely of the axis of said control valve assembly, a piston member extending between said chambers, each of said chambers being connected, to a different one of said hydraulic circuits, said piston intersecting one end of said control valve assembly and having an engaging piece mounted on said piston, said engaging piece and said piston being axially displaceable between a center position and an off-center position, said control valve assembly comprising an axially extending valve piston having a recess in the end thereof adjacent said engaging piece on said piston of said balance piston assembly, said recess in said valve piston being arranged to receive said engaging piece on said piston when said engaging piece is in its center position and when a differential pressure occurs between said chambers in said balance piston assembly said engaging piece is displaced into its off-center position and prevents axial displacement of said valve piston for maintaining said control valve assembly in its non-operative position.

9. A split hydraulic brake system, as set forth in claim 1, wherein said control valve assembly comprises a casing forming a chamber extending in the axial direction, a valve piston positioned within and axially displaceable within the casing in said chamber of said control valve assembly, said element comprising a casing forming a chamber in axial alignment with the chamber in said casing of said control valve assembly, a piston positioned within the chamber in said casing of said element, a spring positioned within the chamber in said casing of said element for biasing said piston toward said piston in said control valve assembly, said piston cooperating with the chamber in said casing of said element for forming a second chamber in the end thereof adjacent said control valve assembly, means for supplying pressurized brake fluid from said hydraulic circuit not containing said control valve assembly into said second chamber, said spring arranged to counterbalance the pressure in the second chamber for maintaining said piston therein in a balanced position, whereby when a decrease in pressure takes place within said second chamber said spring axially displaces said piston relative to said control valve assembly for maintaining said control valve assembly in the non-operative position.

10. In a dual hydraulic brake system, the improvement claimed in claim 1, in which one hydraulic circuit includes the hydraulic brakes of both front wheels and the other hydraulic circuit includes hydrualic brakes of both rear wheels.

11. A split hydraulic brake system, as set forth in claim 1, wherein said means for sensing the hydraulic brake fluid pressure in said circuit which does not contain said control valve assembly comprises a by-pass valve member, said by-pass valve member comprising a casing forming a chamber therein, a piston axially displaceable within said chamber and dividing said chamber into a first sub-chamber and a second sub-chamber spring means for biasing said piston in one direction, one of said hydraulic circuits connecting said master cylinder and said first sub-chamber, the other hydraulic cylinder connecting said master cylinder and the second sub-chamber, said spring being located within said first sub-chamber, first conduit means connecting said first sub-chamber and said front wheel brake cylinders, second conduit means connecting said second sub-chamber and said rear wheel brake cylinders, said control valve assembly being positioned in said second conduit means, third conduit means connected to said chamber intermediate said first and second sub-chambers for conducting flow of hydraulic brake fluid from said by-pass valve member to said second brake cylinders, whereby when the pressure in said first sub-chamber decreases below the pressure supplied by said master cylinder said piston in said by-pass casing is displaced axially and admits flow of pressurized hydraulic brake fluid from said master cylinder to said third conduit means for supplying the pressurized hydraulic brake fluid to said rear wheel brake cylinders without passage through said control valve assembly in said second conduit means.

12. In a dual hydraulic brake system, the improvement claimed in claim 1, in which each hydraulic circuit includes the hydraulic brakes of both front wheels and of a respective rear wheel; and each hydraulic circuit including a respective pressure regulating control valve, a respective solenoid actuated component, and a respective pressure differential responsive switch means controlled solenoid.

13. In a dual hydraulic brake system, the improvement claimed in claim 1, in which one hydraulic circuit includes the hydraulic brakes of the right front wheel and the left rear wheel, and the other hydraulic circuit includes the hydraulic brakes of the left front wheel and the right rear wheel; each hydraulic circuit including a respective pressure regulating control valve, a respective solenoid actuated component and a respective pressure differential responsive switch means actuated solenoid.

14. In a dual hydraulic brake system, the improvement claimed in claim 1, in which each hydraulic circuit includes the hydraulic brakes of both front wheels and both rear wheels; each hydraulic circuit including a respective pressure regulating control valve, a respective solenoid actuated component and a respective pressure differential responsive switch means actuated solenoid.

15. In a dual hydraulic brake system, the improvement claimed in claim 1, in which said solenoid actuated component comprises a by-pass valve connected in parallel with said pressure regulating control valve and operable, when open, to by-pass said pressure regulating control valve; said switch means, responsive to a pressure difference between said hydraulic circuits, controlling said solenoid to open said by-pass valve.

16. In a dual hydraulic brake system, the improvement claimed in claim 15, in which one hydraulic circuit includes the hydraulic brakes of both front wheels and the other hydraulic circuit includes the hydraulic brakes of both rear wheels.

17. In a dual hydraulic brake system, the improvement claimed in claim 15, in which each hydraulic circuit includes the hydraulic brakes of both front wheels and of a respective rear wheel; each hydraulic circuit including a respective pressure regulating control valve, a respective said by-pass valve, and a respective pressure differential responsive switch means controlled solenoid operable to open the associated by-pass valve.

18. In a dual hydraulic brake system, the improvement claimed in claim 15, in which one hydraulic circuit includes the hydraulic brakes of the right front wheel and the rear left wheel, and the other hydraulic circuit includes the hydraulic brakes of the left front wheel and the right rear wheel; each hydraulic circuit including a respective pressure regulating control valve, a respective said by-pass valve, and a respective pressure differential responsive switch means controlled solenoid operable to open the associated by-pass valve.

19. In a dual hydraulic brake system, the improvement claimed in claim 15, in which each hydraulic circuit includes the hydraulic brakes of both front wheels and of both rear wheels; each hydraulic circuit including a respective pressure regulating control valve, a respective said by-pass valve and a respective pressure differential responsive switch means controlled solenoid operable to open the associated by-pass valve.

20. A dual hydraulic brake system for an automotive vehicle comprising a master cylinder for supplying pressurized hydraulic brake fluid to a hydraulic brake system, two separate hydraulic circuits connected to said master cylinder, a first set of brake cylinders positioned in one of said hydraulic circuits and arranged to supply braking force to the front wheels of the automotive vehicle, a second set of brake cylinders positioned in the other one of said hydraulic circuits and arranged to supply braking force to the rear wheels of the automotive vehicle, a control valve assembly arranged in one of said circuits for varying the pressure of the hydraulic brake fluid supplied to the wheels in said circuit, and means for sensing the hydraulic brake fluid pressure in said circuit which does not contain said control valve assembly; said means being arranged in communication with said control valve assembly so that, when a failure occurs in the pressure of the hydraulic brake fluid of said circuit not containing said control valve assembly, said control valve assembly is rendered inoperative and the full pressure from said master cylinder is delivered to said brake cylinders in said circuit containing said control valve; said means for sensing the hydraulic brake fluid pressure comprising a differential pressure switch disposed across each of said hydraulic circuits, and a solenoid-actuated by-pass valve member, said by-pass valve member comprising a casing forming a chamber, a poppet valve contained within said chamber, a solenoid actuated armature positioned within said chamber and axially displaceable therein into contact with said poppet valve, conduit means for connecting said by-pass valve member to said hydraulic circuit containing said control valve assembly with said by-pass valve member being connected to said hydraulic circuit upstream and downstream from said control valve assembly, so that, when a failure occurs in said hydraulic circuit not containing said control valve assembly, said by-pass valve member is held in the opened position for supplying full master cylinder pressure around said control valve assembly.

* * * * *